United States Patent [19]

Yokokura et al.

[11] Patent Number: 5,067,797
[45] Date of Patent: Nov. 26, 1991

[54] LIQUID CRYSTAL DISPLAY CELL AND PROCESS FOR PRODUCING THE SAME

[75] Inventors: Hisao Yokokura, Hitachi; Tadao Nakada; Teruo Kitamura, both of Katsuta; Akio Mukoh, Mito; Yasuhiko Kando, Mobara; Isoji Sakai, Kobe; Yasuo Fujimura; Noboru Masutani, both of Ashiya; Tsunetaka Matsumoto, Kobe; Yasuo Imanishi, Hitachi, all of Japan

[73] Assignees: Hitachi, Ltd., Tokyo; Nitto Denko Corporation, Osaka, both of Japan

[21] Appl. No.: 326,557

[22] Filed: Mar. 21, 1989

[30] Foreign Application Priority Data

| Mar. 25, 1988 | [JP] | Japan | 63-69276 |
| Aug. 26, 1988 | [JP] | Japan | 63-210752 |
| Oct. 6, 1988 | [JP] | Japan | 63-253394 |

[51] Int. Cl.$^5$ .............................. G02F 1/133
[52] U.S. Cl. .......................... 359/76; 428/1; 359/75; 359/79
[58] Field of Search ............ 350/340, 341; 428/1

[56] References Cited

U.S. PATENT DOCUMENTS

| 4,469,408 | 9/1984 | Krüger et al. | 350/340 |
| 4,882,207 | 11/1989 | Coates et al. | 350/340 |
| 4,911,958 | 3/1990 | Mochizuki et al. | 350/341 |
| 4,939,003 | 7/1990 | Aoki et al. | 350/341 |

FOREIGN PATENT DOCUMENTS

| 3020645 | 10/1981 | Fed. Rep. of Germany. |
| 3027571 | 2/1982 | Fed. Rep. of Germany. |
| 3107633 | 9/1982 | Fed. Rep. of Germany. |
| 3727945 | 2/1988 | Fed. Rep. of Germany. |

Primary Examiner—John Zazworsky
Assistant Examiner—Anita Pellman Gross
Attorney, Agent, or Firm—Antonelli, Terry, Stout & Kraus

[57] ABSTRACT

A liquid crystal display cell, wherein orientation films are made of an organic polymer such as polyimide, polyamide, liquid crystal polymer having one or more mesogen groups in a main chain or side chain and produced by spreading an organic polymer solution on a water surface, is excellent in memory properties and contrast and generates no static electricity, no short circuit between electrodes and no breaking of electrodes.

14 Claims, 4 Drawing Sheets

LIQUID CRYSTAL DISPLAY CELL AND PROCESS FOR PRODUCING THE SAME

BACKGROUND OF THE INVENTION

This invention relates to a liquid crystal display cell having special orientation films therein, and more particularly to a liquid crystal display cell having orientation films formed by a water surface spreading method and suitable for use as nematic liquid crystal display devices and ferroelectric liquid crystal display devices, and a process for producing the same.

Liquid crystal display cells have been practically used in various displays. In order to obtain good display quality, it is necessary to orientate liquid crystal molecules uniformly. Orientation films for liquid crystals play such a role. Thus, many developments and studies on orientation films have been made. Heretofore, there have practically been used in liquid crystal display devices inorganic orientation films obtained by oblique vapor deposition of inorganic compounds such as SiO, etc.; organic orientation films obtained by forming an organic polymer film of polyimide or the like, followed by rubbing with a piece of cloth (e.g. Japanese Patent Unexamined Publication Nos. 50-83051, and 51-65960 or U.S. Pat. Nos. 3,834,792 and 3,994,567). Recently, it is proposed to use a film of monomolecular layer or a film of multi-laminated monomolecular layers of polyimide or the like obtained by a so-called Langmuir-Blodgett method (hereinafter referred to as "LB method") as the orientation film in liquid crystal display devices (e.g. Japanese Patent Unexamined Publication Nos. 62-209415, 62-211617 and 62-215928).

The above-mentioned orientation films, however, have many disadvantages, respectively. In the case of the inorganic orientation films formed by the oblique vapor deposition, it is necessary to use a vacuum device such as a vacuum vapor deposition device for forming the orientation films, which results in making producibility in mass production insufficient.

On the other hand, in the case of the organic orientation films, they are remarkably excellent in mass production but have a defect in that it is impossible to coat a polymer film with a uniform film thickness. Further, the rubbing treatment with a piece of cloth causes problems in that static electricity is generated, the surface of orientation film is contaminated, and the like. For example, in the case of a super-twisted liquid crystal display cell (STN) using nematic liquid crystals [e.g. SID International Symposium p. 120-123 (1985)], there take place unevenness of display due to non-uniformity of threshold voltage (Vth) caused by film thickness of orientation film, and non-lighted portions due to breakage of indium tin oxide (ITO) electrodes caused by static electricity. Further, short circuit between electrodes is easily produced. In addition, contamination of the orientation film surface causes non-uniformity of frequency dependence of threshold voltage, which results in causing unevenness of display.

In the case of active matrix liquid crystal display devices, the rubbing treatment produces damage of switching elements of thin film transistors (TFT) or diodes, or badness of lighting due to changes in switching properties. Further, it is difficult to control the load by the substrate as a whole at the time of rubbing. Particularly, in the case of a large liquid crystal display device, injuries are caused by rubbing.

In the case of orientation films formed by the LB method, no problems caused by static electricity are produced, but there is a problem in mass production. That is, a polymer film formed by the LB method is a monomolecular film having a film thickness of about 4 Å. Thus, the film thickness is too thin to hide ITO electrodes: this is not preferable from the viewpoint of display quality. Organic orientation films now practically used require the film thickness of about 500 Å or more from the viewpoint of display quality. But according to the LB method, a film of 500 Å thick can be formed by laminating 125 layers of a single LB film of about 4 Å. Thus, the formation of orientation films by the LB method is not suitable for practical production due to remarkably poor workability.

Further, Japanese Patent Unexamined Publication Nos. 57-40228 and 62-227122 propose to use liquid crystal polymers as orientation films but uniform film thickness cannot be obtained by usual coating methods.

SUMMARY OF THE INVENTION

It is an object of the present invention to provide a liquid crystal display cell overcoming the disadvantages mentioned above and being suitable for mass production, and a process for producing the same.

The present invention provides a liquid crystal display cell comprising two spaced substrates having transparent electrodes arranged thereon in desired display patterns, a liquid crystal composition being sealed between the inner surfaces of said two substrates by a sealant, and two orientation films being arranged on individual transparent electrodes, said orientation films having a film thickness of 0.1 $\mu$m or less and at least one of said orientation films being made of an organic polymer and oriented by arranging organic polymer molecular chains in one direction in a single layer of 0.003 $\mu$m or more thick.

The present invention also provide a process for producing a liquid crystal display cell, which comprises
  supplying a solution of organic polymer on a water surface,
  drawing said solution in one direction to form a film,
  adhering the resulting water surface spreaded film to a predetermined portion of electrodes arranged on a substrate,
  pouring a liquid crystal composition into a space formed by a pair of the thus produced electrode substrates having orientation films thereon and a spacer, and
  sealing the liquid crystal composition by a sealant.

BRIEF DESCRIPTION OF THE DRAWINGS

FIG. 2 is a rough sketch showing a spreading state of an organic polymer solution, wherein

DESCRIPTION OF THE PREFERRED EMBODIMENTS

Figure 7:
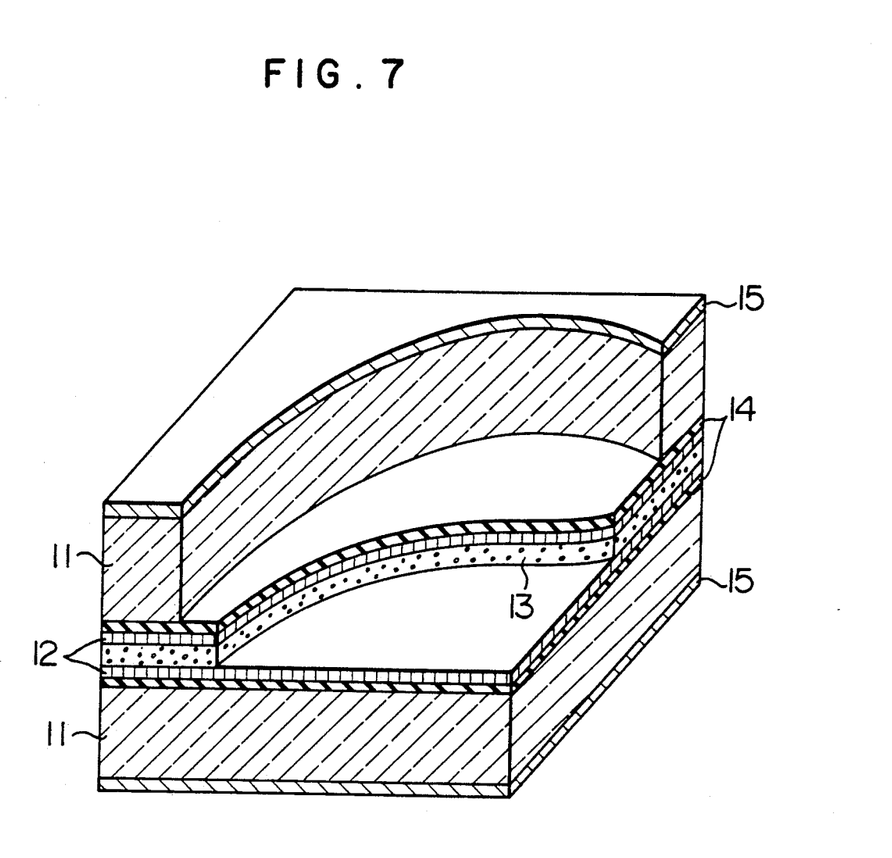
FIG. 7 is a partially cross-sectional perspective view of a liquid crystal display cell.

The structure of the liquid crystal display cell of the present invention is explained referring to FIG. 7.

The liquid crystal display cell comprises two spaced substrates 11, at least one of which is transparent and made of, for example, glass and the like, having transparent electrodes arranged thereon in desired display patterns, a liquid crystal composition 13 being sealed between the inner surfaces of said two substrates 11 by a sealant (not shown in the drawing), and two orientation films 12 being arranged on individual transparent electrodes preferably via insulating films 14. In practical use, a pair of polarizing plates 15 are formed on the substrates 11.

The orientation films have a film thickness of 0.1 $\mu$m or less and at least one of the orientation films is made of an organic polymer, and oriented by arranging organic polymer molecular chains in one direction in a single layer of 0.003 $\mu$m or more thick.

Such a special orientation film can be formed by a so-called water surface spreading film-forming method and can orient liquid crystal molecules.

According to the water surface spreading film-forming method, a polymer film of 30 Å (0.003 $\mu$m) to 1000 Å (0.1 $\mu$m) thick can be formed on a glass substrate in a remarkably short time by one treatment. Further, by drawing or taking up a film spreaded on a water surface in one direction, there can be obtained a film wherein organic polymer molecular chains are oriented in one direction in the whole thickness of a single layer. This is quite contrary to an ordinary oriented film obtained by rubbing treatment, wherein only organic polymer molecular chains in only a rubbed surface portion are oriented in one direction.

Since the orientation film obtained by the water surface spreading film-forming method is oriented in one direction, it is not necessary to subject the obtained film to a rubbing treatment. Unnecessity of the rubbing treatment causes no generation of static electricity, no breaking of electrodes and TFT, and no contamination of orientation film interfaces. Further, no unevenness of display is caused due to non-uniform film thickness. In addition, since a thick organic polymer film of 30 Å or more can be formed by one treatment, the productivity is excellent without lowering display quality. Moreover, when the cell is used as a ferroelectric liquid crystal display device, said device is excellent both in uniform orientation (contrast ratio) and memory properties.

Needless to say, if necessary, the rubbing treatment can be applied to the orientation film obtained by the water surface spreading film-forming method. In such a case, the rubbing force can be reduced remarkably compared with the conventional rubbing treatment to obtain the same effect.

Figure 1:
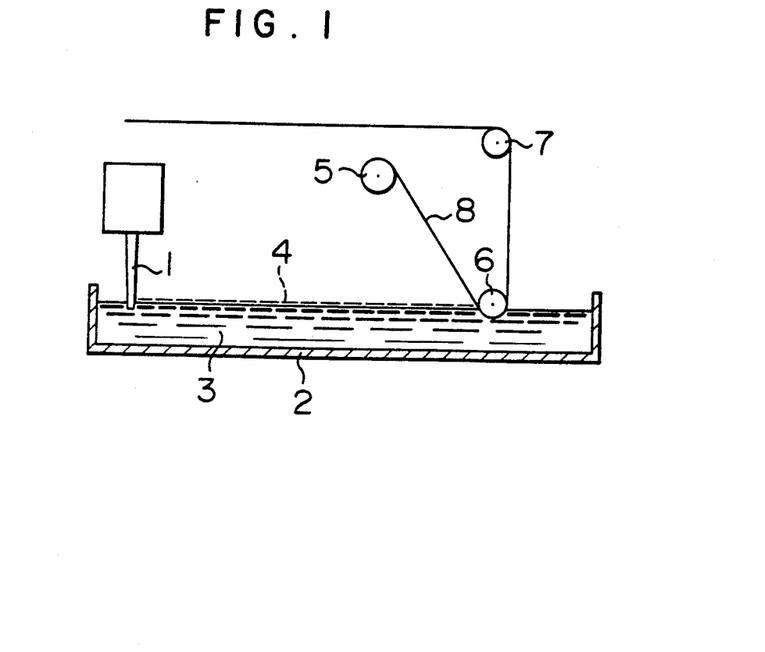
FIG. 1 is a rough sketch of one example of a continuous film-forming device by a water surface spreading method for forming an orientation film used in a liquid crystal display cell of the present invention.

The water surface spreading film-forming method is a film-forming method using a device shown in FIG. 1, wherein numeral 1 denotes a nozzle for an organic polymer solution, numeral 2 denotes a water tank, numeral 3 denotes a water surface, numeral 4 denotes a film formed, 5, 6 and 7 denote rolls, and numeral 8 denotes an electrode substrate in a film state.

Figures 2A, 2B:
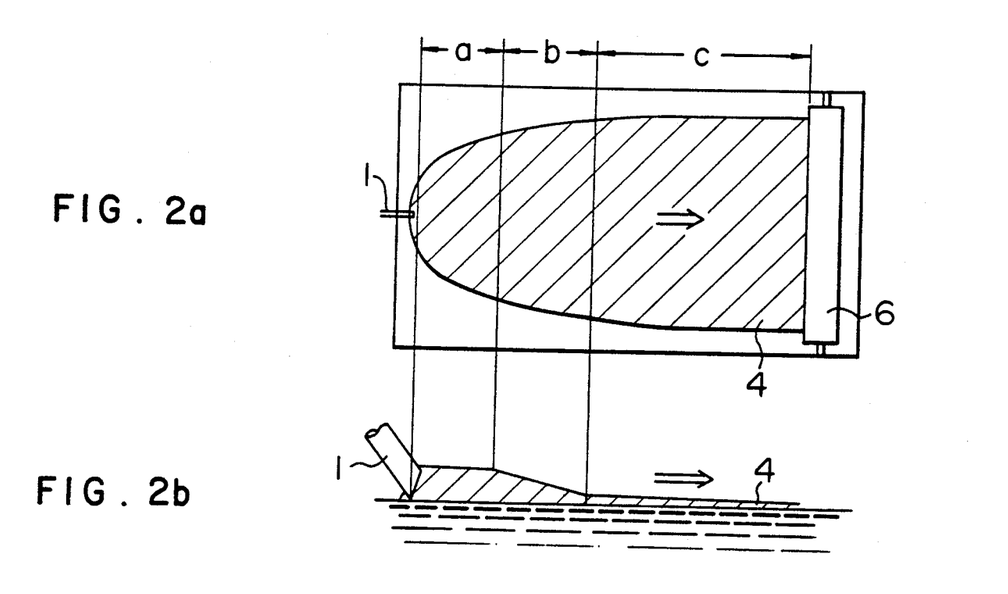
FIG. 2(a) is a plane view thereof and FIG. 2(b) is an enlarged cross-sectional view thereof.

As shown in FIG. 1, when an organic polymer solution is discharged (or casted) from the nozzle 1 using a constant volume delivery pump on the water surface 3 in the water tank 2, the solution spontaneously spread on the water surface to form the film 4 as shown in FIG. 2. FIG. 2 is a rough sketch showing a spreading state of the organic polymer solution, wherein FIG. 2(a) is a plane view thereof and FIG. 2(b) is an enlarged cross-sectional view thereof. In FIG. 2(a), "a" is a solution portion, "b" is a gel portion, and "c" is a solid film portion.

The thus formed film 4 is either contacted with a film-like electrode substrate 8 moved by rolls 5, 6 and 7, or taken up while adhering the film to a surface of the film-like electrode substrate or predetermined portions of electrode substrates of liquid crystal display cells and moving. In this case, by taking up the film at a speed faster than a spontaneous spreading speed of the organic polymer solution on the water surface, molecular orientation can be imparted.

The thus obtained orientation film has an effect of orienting liquid crystal molecules in a predetermined direction.

In the case of liquid crystal display cell, liquid crystals should be oriented monoaxially by making the orientation film have orientation and anisotropy in the film direction. In the present invention, the orientation and anisotropy in the film direction is obtained without the usual rubbing treatment. This is unexpected results of the water surface spreading film-forming method.

The water surface spreaded film can directly be adhered to a plurality of electrode substrates by contacting the water surface spreaded orientation film with a plurality of electrode substrates moving at the same speed as the taking-up speed of the water surface spreaded orientation film one after another and adhering the orientation film to the electrode substrates continuously.

As the organic polymer, there can be used any organic polymers which can form films by the water surface spreading film-forming method. Examples of such organic polymers are various polyimides, polyamide-acids which are precursors of polyimides, copolymers of polyimides or polyamide-acids, polypara-xylylene, polyesters, polycarbonates, polyamides, melamine resins, urea resins, polyolefins such as polybutene, polymethylpentene, etc., cellulose deviatives such as cellulose acetate, etc., fluorine-containing polymers such as polyvinyl fluorides, polyvinylidene fluorides, etc., acrylic polymers such as polymethyl methacrylate, etc., liquid crystal polymers (e.g. lyotropic liquid crystal polymers and thermotropic liquid crystal polymers) having one or more mesogen groups in a main chain or a side chain.

Among these organic polymers, polyimides, polyamide-acids, and liquid crystal polymers having one or more mesogen groups in the main chain or side chain are preferable.

Polyimides and polyamide-acids can be produced by reacting a diamine compound or dibasic acid hydrazide compound with a tetracarboxylic acid dianhydride.

Examples of the tetracarboxylic acid dianhydride are pyromellitic dianhydride, 3,3',4,4'-benzophenonetetracarboxylic dianhydride, 3,3',4,4'-biphenyltetracarboxylic dianhydride, cyclopentanetetracarboxylic dianhydride, cyclobutanetetracarboxylic dianhydride, naphthalenetetracarboxylic dianhydride, pyridinetetracarboxylic dianhydride, perylenetetracarboxylic dianhydride, 4,4'-disalfonyldiphthalic dianhydride, bis[-dicarboxyphenoxy)-phenyl]propanetetracarboxylic dianhydride, bis(dicarboxyphenoxy)diphenyl ether tetracarboxylic dianhydride, bis[(dicarboxyphenoxy)-phenyl]hexafluoropropanetetracarboxylic dianhydride, butanetetracarboxylic dianhydride, etc. These tetracarboxylic acid dianhydrides can be used alone or as a mixture thereof.

As the diamine or dibasic acid hydrazide, there can be used phenylenediamine, diphenylenediamine, triphenylenediamine, a compound of the formula:

wherein X is a direct bond, —O—, —CH—, —SO$_2$—, —CO—, a compound of the formula:

wherein X is as defined above, for example, a bis(aminophenoxy)diphenyl compound of the formula:

Concrete examples of diamines are p-phenylenediamine, m-phenylenediamine, 4,4'-diaminoterphenyl, 4,4'-diaminodiphenyl sulfone, 3,3'-diaminodiphenyl sulfone, 4,4'-diaminodiphenyl ether, 4,4'-diaminophenyl benzoate, 4,4'-diaminodiphenylmethane, 2,2-(4,4'-diaminodiphenyl)propane, 4,4'-bis(p-aminophenoxy)diphenyl sulfone, 4,4'-bis(m-aminophenoxy)diphenyl sulfone, 4,4'-bis(p-aminophenoxy)diphenyl ether, 4,4'-bis(p-aminophenoxy)diphenyl ketone, 4,4'-bis(p-aminophenoxy)-diphenylmethane, 2,2-[4,4'-bis(p-aminophenoxy)diphenyl]-propane, 2,2-[4,4'-bis(p-aminophenoxy)diphenyl]-hexafluoropropane, and 4,4'-diamino-3-carbamoyldiphenyl ether of the formula:

It is also possible to use diaminosiloxane compounds such as

Examples of the dibasic acid hydrazide compounds are isophthalic acid dihydrazide, terephthalic acid dihydrazide, 4,4'-dihydrazide diphenyl ether, 4,4'-dihydrazide diphenyl sulfone, 4,4'-dihydrazide diphenyl, 4,4'-dihydrazide diphenylmethane, 4,4'-dihydrazide phenylbenzoate, 4,4'-dihydrazide diphenyl sulfone, 4,4'-bis-(p-hydrazidephenoxy)diphenyl sulfone, 4,4'-bis(m-hydrazidephenoxy)diphenyl sulfone, 4,4'-bis(p-hydrazide-phenoxy)diphenyl ether, 2,2-[4,4'-bis(p-hydrazide-phenoxy)-diphenyl]propane, 2,2-[4,4'-bis(p-hydrazide-phenoxy)-diphenyl]hexafluoropropane, oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, etc. These dibasic acid hydrazides can be used alone or as a mixture thereof.

The above-mentioned diamine compounds and dibasic acid hydrazide compounds can be used as an N-silylated diamine compound and N-silylated dibasic acid hydrazide compound after silylation As a solvent for the reaction, there can be used those which can dissolve polyamide-acid and polyimide. For example, there can be used N-methylpyrrolidone, dimethylacetamide, dimethylformamide, dimethylsulfoxide, cresol and phenol, alone or as a mixture thereof.

When the use of one kind of solvent is insufficient for providing water surface spreading film-forming properties, it is effective to use a secondary organic solvent as a spreading auxiliary. As the spreading auxiliary, there can be used aliphatic, alicyclic and aromatic ketones such as acetophenone, cyclohexanone, etc., esters such as butyl butyrate, alcohols such as amyl alcohol, benzyl alcohol, etc., amines, aldehydes, peroxides, etc. alone or as a mixture thereof.

It is preferable to use a polyamide-acid or polyimide preferably having an inherent viscosity (measured at 30° C. with a concentration of 0.5 g of polymer per 100 ml of a solvent) of 0.3 to 5.0. When the inherent viscosity is too low, strength of the resulting polyimide orientation film is lowered. On the other hand, when the inherent viscosity is too high, the flow of the polymer solution is worsened to make the thin film formation difficult.

As the liquid crystal polymer, there can be used those having one or more mesogen groups in a main chain or a side chain and being able to be dissolved in an organic solvent.

Examples of the liquid crystal polymers having one or more mesogen groups in the main chain are aromatic polyamides such as poly(p-phenyleneterephtharamide) (commercially avilable by a trade name of Kevlar mfd. by E.I. du Pont de Nemours and Co.), poly(p-benzamide), etc.; cellulose derivatives such as hydroxypropyl cellulose, etc.; polypeptides such as poly(Y-benzyl-L-glutamate), etc.; block polymers such as styrene-ethy- lene oxide block polymer, etc.; poly(p-phenylenebenzobisthiazole), polyterephthaloylhydrazide, etc. These polymers are used as polymers showing lyotropic liquid crystal properties.

As the main chain type liquid crystal polymers showing thermotropic liquid crystal properties, there can be used polyester series liquid crystal polymers. For example, a copolymer of polyethylene terephthalate and p-hydroxybenzoic acid shows liquid crystal properties in a wide range of composition and can be dissolved in chloroform, a mixed solvent of phenol/tetrachloroethane, etc. Therefore, such a polymer can preferably be used in the water surface spreading film-forming method.

Other examples of polyesters are represented by the formulae:

where R is —CH$_3$, —Cl or n is an integer of preferably 10 to 50; and a is an integer of preferably 2 to 5.

It is also possible to use a polyazo(xy)phenol alkanoate represented by the formula:

wherein m is an integer of preferably 2 to 5; and n is as defined above.

Polyamides represented by the formula:

wherein n and a are as defined above, can be used as materials showing thermotropic properties.

Polyazomethine of the formula:

wherein R and n are as defined above, can also be used.

As the mesogen groups used in the above-mentioned side chain type liquid crystal, there can be used almost compounds usable as low molecular weight liquid crystal compounds. Examples of the skeleton chain of the side chain type liquid crystal polymers are polystyrene, polyacrylate, polymethacrylate, polysiloxane, and polymalonate. For example, in the case of having polyacrylate as the skeleton chain, the side chain type liquid crystal polymer is represented by the formula:

$$+CH_2-CH\!\!\rightarrow_{\!\!n}$$
$$\quad\quad COO+CH_2\rightarrow_{\!\!m}\!R^1$$

wherein R$^1$ is

R$^2$ is

—CN or —O+CH$_2$)$_{\overline{a}}$CH$_3$;

and a is 0 to 8.

More concretely, the following side chains are preferable:

The above-mentioned liquid crystal polymers can be used alone, or used by copolymerization with other monomers or blending with other polymers. It is possible to mix with one or more non-liquid crystal polymers, so long as the effect of the present invention is not lowered.

The organic solvent for uniformly spreading the above-mentioned liquid crystal polymers on a water surface for film-formation can be selected depending on the material used. Generally speaking, liquid crystal polymers (particularly those showing thermotropic liquid crystal properties) are poor in solubility. In the case of aromatic polyamides, the solubility can be improved by copolymerization with a bridged biphenylene type compound (e.g. 3,8-diaminophenanthridinone).

Typical examples of the solvent for spreading are N,N-dimethylacetamide, and N-methylpyrrolidone for particularly aromatic polyamides. If necessary, it is effective to add a salt such as LiCl, $CaCl_2$, or the like. Phenolic solvents such as phenol, p-chlorophenol, etc. are effective for spreading, for example, polyester type liquid crystal polymers on the water surface.

When the above-mentioned organic solvents are insufficient for carrying out the water surface spreading film-forming method, it is effective to add a secondary organic solvent as a spreading auxiliary. As the spreading auxiliary, there can be used aliphatic, alicyclic or aromatic ketones, esters, alcohols, amines, aldehydes, peroxides, alone or as a mixture thereof as mentioned above. The spreading auxiliary can preferably be used in an amount of 1% by weight or more.

The concentration of the organic polymer solution used for the water surface spreading film-forming method is preferably 0.5 to 30% by weight, more preferably 1 to 20% by weight. When the polymer concentration is too low, it is difficult to form a uniform continuous film. On the other hand, when the polymer concentration is too high, spreading properties of the organic polymer solution on the water surface are undesirably lowered.

The orientation film can directly be formed on a substrate having electrodes thereon (electrode substrate). It is possible to use a substrate having an inorganic insulating film made of $SiO_2$, $Al_2O_3$ or $TiO_2$, and/or a coupling agent (e.g. silane coupling agent) layer, formed under or above the electrodes.

In order to obtain a tougher orientation film, it is effective to co-use one or more epoxy series silane coupling agents and/or amino series silane coupling agents.

The orientation film formed on the water surface can be directly laminated on electrode substrates. It is possible to transfer the orientation film previously formed on a film such as a separator to a glass plate (substrate) having transparent electrodes thereon.

The orientation film can be formed on an electrode substrate in a single layer or a plurality of layers. In the case of forming a plurality of layers, it is preferable to laminate each layer after completely removing the water by drying from each layer. In the case of an orientation film made of a polyamide-acid, imidization can be carried out after film-formation with heating or chemical treatment, if necessary.

Alignment state of organic polymer molecular chains in a film formed by the water surface spreading film-forming method can be evaluated by an infrared dichroic ratio. In the case of forming a film by an ordinary casting method, the infrared dichroic ratio is 1.0 and orientation is not imparted. In contrast, in the case of a film formed by the water surface spreading film-forming method, the infrared dichroic ratio is 1.5 or more and orientation is imparted.

Figure 4:
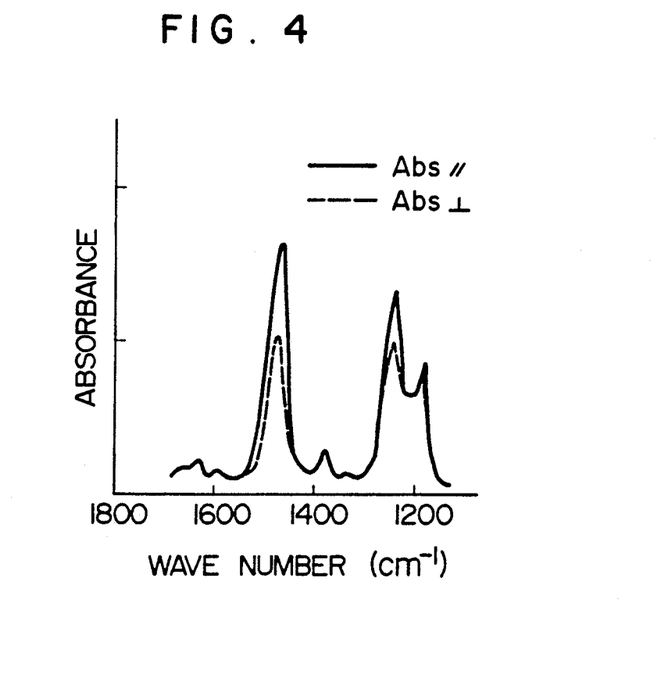
FIG. 4 is a graph showing measured spectra of infrared dichroic properties of orientation films measured by using FT-IR.

The infrared dichroic ratio of the orientation film can be obtained using, for example, an infrared spectrometer (FT-IR, Nicolet type 170SX, a trade name, mfd. by Nicolet Instrument Corp.). That is, an orientation thin film alone can be used as a sample, or a sample can be formed by laminating an orientation thin film on a substrate (e.g. silicon wafer) which is transparent as to infrared rays. A polarizer is placed between the sample and infrared beams and infrared absorption spectrum is measured by a transmission method. FIG. 4 shows such spectra. By measuring the absorbance (Abs $\parallel$) wherein the infrared linear polarizing axis is parallel to the film-forming direction of the thin film and the absorbance (Abs$\perp$) wherein the infrared linear polarizing axis is perpendicular to the film-forming direction of the thin film, the infrared dichroic ratio (Abs $\parallel$ /Abs$\perp$) can be obtained at a predetermined wavelength.

Figure 3:
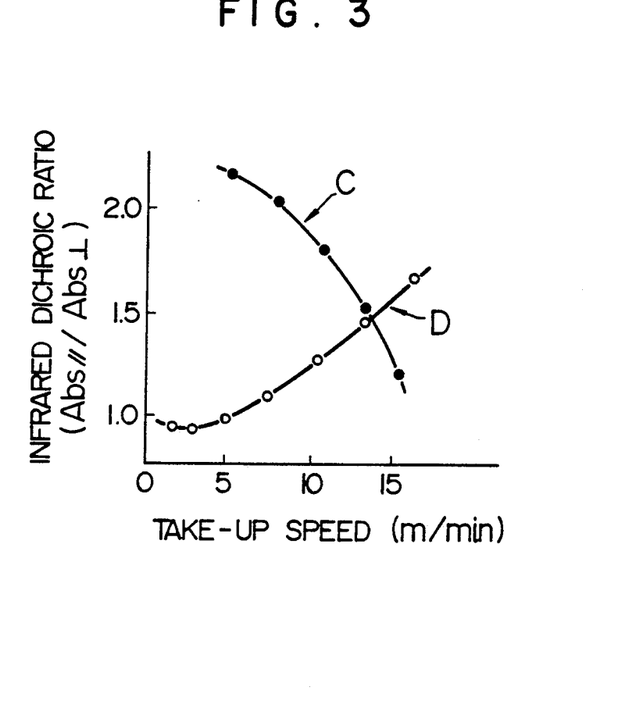
FIG. 3 is a graph showing a relationship between the infrared dichroic ratio of orientation films and the take-up speed.

The infrared dichroic ratio of the orientation film is influenced by the take-up speed of the formed film as shown in FIG. 3, wherein the infrared dichroic ratio (Abs $\parallel$ /Abs$\perp$) is taken along the ordinate axis and the take-up speed (m/min) is taken along the abscissa axis. In FIG. 3, the curve C. shows a liquid crystal polyester and the curve D shows a fluorine-containing polyamide-acid.

As liquid crystal compounds to be sealed in the cell, there can be used nematic liquid crystals represented by the formulae (1) to (7), ferroelectric liquid crystals represented by the formulae (8) to (12), and mixtures of liquid crystals conventionally used:

(1)

(2)

(3)

(4)

(5)

(6)

(7)

wherein A and B are independently an alkyl group, an alkoxy group, or cyano group, or an fluorine atom.

(8), (9), (10), (11), (12)

The liquid crystal composition sealed in the cell may contain one or more nematic liquid crystal compounds. In such a case, the nematic liquid crystal layer sandwiched between two electrode substrates may take a structure wherein the long axis direction of liquid crystal molecules is twisted 80° to 280° between the two electrode substrates under an electric field of zero. Further, the liquid crystal layer may contain one or more ferroelectric liquid crystal compounds of the formulae (8) to (12).

As to the electrodes, there can be used active matrix type electrodes. That is, one of the electrode substrates may have a switching element such as a thin film transistor (TFT) or a diode.

The present invention is illustrated by way of the following Examples, in which all percents are by weight unless otherwise specified.

EXAMPLE 1

0.1 Mole of 3,3′,4,4′-biphenyltetracarboxylic dianhydride was reacted with 0.1 mole of 2,2-[4,4′-bis-(p-aminophenoxy) diphenyl]hexafluoropropane in dimethylacetamide at room temperature for 4 hours with stirring to give a solution of polyamide-acid having an inherent viscosity of 3.5. The obtained polyamide-acid was diluted with a mixed solvent of dimethylacetamide/acetophenone (1:1 by weight) to give a polyamide-acid varnish with 5% solid content. The resulting varnish was subjected to film-formation by the water surface spreading method at a film-forming speed of 15 m/min to give a polyamide-acid orientation film having a film thickness of 1000 Å and an infrared dichroic ratio of 1.35 (wavelength 1500 cm$^{-1}$). The orientation film was laminated on striped form transparent electrode substrates (electrode width 200 μm, space 50 um). The resulting substrates were faced oppositely via a spacer of 6 μm so as to make the film-forming directions cross at a right angle. Into the resulting space, the following phenylcyclohexane nematic liquid crystal composition comprising:

(40 mole %)

(30 mole %)

(30 mole %)

was poured and the outer peripheral portion was sealed with an epoxy resin. Then, a pair of polarizing plates having the same polarizing axis direction as the film-forming direction of orientation film were adhered to the substrates to give a liquid crystal display cell. The resulting liquid crystal display cell showed uniform orientation properties without unevenness in orientation.

Figure 5:
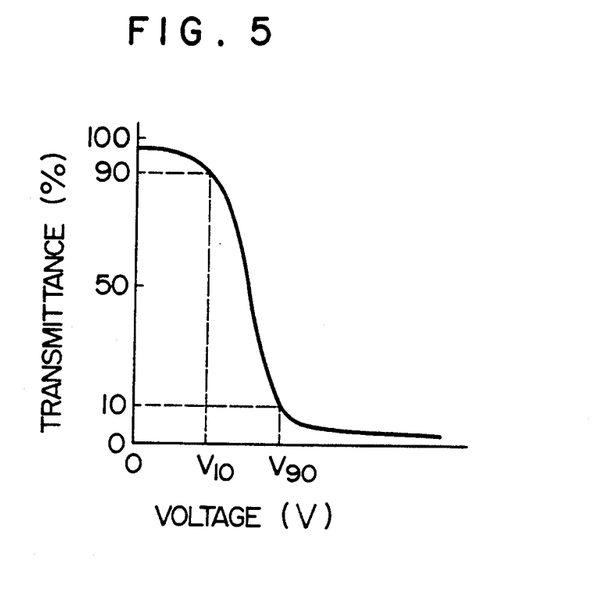
FIG. 5 is a graph showing threshold properties.

The response speed was measured at frequency of 32 Hz and applied voltage of 5 V. As a result, the rise time (Tr) was 5 msec and the decay time (Td) was 20 msec. Further, electro-optical properties were shown in FIG. 5, wherein the voltage-transmittance characteristics ($\gamma = V_{90}/V_{10}$) was 1.50. FIG. 5 is a graph showing a relationship between the voltage (V) and the transmittance (%), that is, threshold properties.

Further, the liquid crystal display cell generated no static electricity, no short circuit between electrodes, and no breaking of electrodes. In addition, the electrodes were not visible by the naked eye.

EXAMPLE 2

The polyamide-acid orientation film obtained in Example 1 by the water surface spreading film-forming method was imidized by heat treatment at 250° C. for 1 hour [infrared dichroic ratio 1.30 (wavelength 1500 cm$^{-1}$)]. The film thickness was 600 Å. Then, a liquid crystal display cell was produced in the same manner as described in Example 1.

The resulting liquid crystal display cell was good in orientation properties, and showed electro-optical properties of Tr of 8 msec. and Td of 30 msec. when measured at frequency of 32 Hz and applied voltage of 5 V. γ was 1.60. Further, the liquid crystal display cell generated no static electricity, no short circuit between electrodes, and no breaking of electrodes. In addition, the electrodes were not visible by the naked eye.

EXAMPLE 3

0.1 Mole of 3,3′,4,4′-benzophenonetetracarboxylic dianhydride was reacted with 0.1 mole of 4,4′-bis(m-aminophenoxy)diphenyl sulfone in a mixed solvent of cresol and toluene at 150° C. for 5 hours with stirring to give a solution of polyimide having an inherent viscosity of 5.0. The polyimide solution was re-precipitated in an alcohol and re-dissolved in N-methylpyrrolidone so as to make the solid content 3%, followed by mixing with 20% of acetophenone. Using the resulting solution, an orientation film was prepared by the water surface spreading film-forming method at a film-forming speed of 10 m/min. The resulting film had the film thickness 300 Å and the infrared dichroic ratio of 1.10 (wavelength 1500 cm$^{-1}$). The orientation film was laminated on striped form transparent electrode substrates (electrode width 200 μm, space 50 μm). The resulting substrates were faced oppositely via a spacer of 7 μm so as to make the film-forming directions cross at a right angle. Into the resulting space, the following liquid crystal composition comprising:

(30 mole %)

(30 mole %)

(40 mole %)

was poured and the outer peripheral portion was sealed with an epoxy resin. Then, a pair of polarizing plates having the same polarizing axis direction as the film-forming direction of orientation film were adhered to the substrates to give a liquid crystal display cell. The resulting liquid crystal display cell showed uniform orientation properties without unevenness in orientation.

The response speed was measured at frequency of 32 Hz and applied voltage of 5 V. As a result, Tr was 13 msec. and Td was 35 msec. γ was 1.65. Further, the liquid crystal display cell generated no static electricity, no short circuit between electrodes, and no breaking of electrodes. In addition, the electrodes were not visible by the naked eye.

EXAMPLE 4

0.05 Mole of pyromellitic dianhydride, 0.05 mole of 3,3',4,4'-benzophenonetetracarboxylic dianhydride, and 0.1 mole of isophthalic acid dihydrazide were stirred in a dimethylacetamide solution at room temperature for 6 hours to give a solution of polyhydrazide acid having an inherent viscosity of 2.4. The obtained polyhydrazide acid solution was diluted to 2% solution. In the same manner as described in Example 3, there was obtained a polyhydrazide acid orientation film having a film thickness of 200 Å and an infared dichroic ratio of 1.20 (wavelength 1500 cm$^{-1}$). The orientation film was laminated on striped form transparent electrode substrate (electrode width 200 μm, space 50 μm). The resulting substrates were faced oppositely via a spacer of 5 um so as to make the film-forming directions cross at a right angle. Into the resulting space, the following liquid crystal composition comprising:

(20 mole %)

(40 mole %)

(40 mole %)

was poured and the outer peripheral portion was sealed with an epoxy resin. Then, a pair of polarizing plates having the same polarizing axis direction as the film-forming direction of orientation film were adhered to the substrates to give a liquid crystal display cell. The resulting liquid crystal display cell showed uniform orientation properties without unevenness in orientation.

The response speed was measured at frequency of 32 Hz and applied voltage of 5 V. As a result, Tr was 10 msec. and Td was 30 msec. γ was 1.48. Further, the liquid crystal display cell generated no static electricity, no short circuit between electrodes, and no breaking of electrodes. In addition, the electrodes were not visible by the naked eye.

EXAMPLE 5

0.05 Mole of 3,3',4,4'-bisphenyltetracarboxylic dianhydride, 0.05 mole of pyromellitic dianhydride, 0.05 mole of 4,4'-diaminodiphenyl ether and 0.05 mole of 2,2-[4,4'-bis(p-hydrazidephenoxy)diphenyl]hexafluoropropane were stirred in a N-methylpyrrolidone solution at room temperature for 8 hours to give a solution of polyamide acid-hydrazide acid having an inherent viscosity of 1.5. The obtained polyamide acid-hydrazide acid solution was diluted to 1% solution with N-methylpyrrolidone/acetophenone (1:1 weight ratio). The resulting solution was subjected to the water surface spreading film-forming at a film-forming rate of 10 m/min to give a polyamide acid-hydrazide acid orientation film having a film thickness of about 30 Å and an infrared dichroic ratio of 1.15 (wavelength 1500 cm$^{-1}$). The orientation film was laminated on striped form transparent electrode substrates (electrode width 200 μm, space 50 μm). The resulting substrates were faced oppositely via a spacer of 4 μm so as to make the film-forming directions cross at a right angle. Into the resulting space, the following ferroelectric liquid crystal composition showing Sc* phase comprising:

(50 mole %)

(25 mole %)

(25 mole %)

poured and the outer peripheral portion was sealed with an epoxy resin. Then, a pair of polarizing plates having the same polarizing axis direction as the film-forming direction of orientation film were adhered to the substrates to give a liquid crystal display cell. The resulting liquid crystal display cell showed uniform orientation properties without unevenness in orientation.

Figure 6:
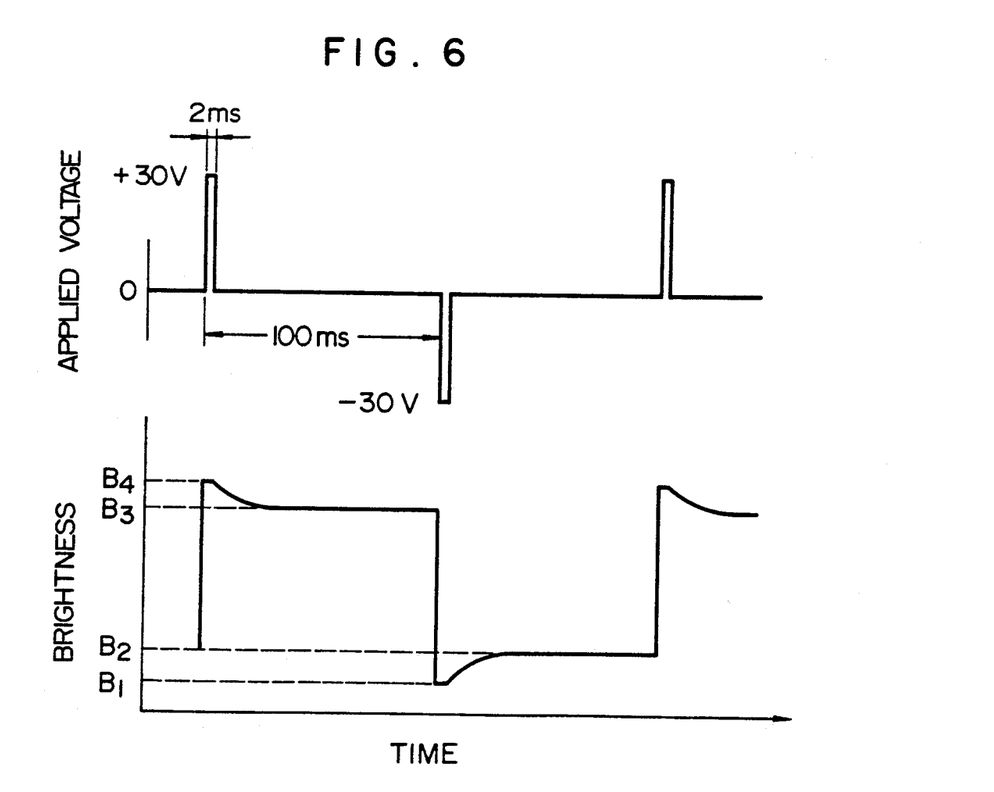
FIG. 6 is a graph showing memory evaluation properties.

Further, electro-optical properties were also measured and shown in FIG. 6. FIG. 6 shows memory properties evaluation in terms of relationships between brightness and time and applied voltage and time.

Provided that the contrast ratio at the time of electric field applied is expressed by $$C_R = B_4/B_1$$

and the contrast ratio between two memory states is expressed by $$C_R{}^M = B_3/B_2$$

the ratio of the two contrast ratios becomes $$M = (C_R{}^M - 1)/(C_R - 1)$$

That is, as a parameter showing stability of memory state, memory properties (M) can be obtained by measuring the contrast ratio between two memory states and the contrast ratio at the time of electric field applied In this Example, when $M = 1$, the contrast ratio was as good as 15:1.

Further, the liquid crystal display cell generated no static electricity, no short circuit between electrodes, and no breaking of electrodes.

EXAMPLE 6

0.1 Mole of 3,3′,4,4′-benzophenonetetracarboxylic dianhydride, 0.09 mole 4,4′-bis(m-aminophenoxy)diphenyl sulfone and 0.01 mole 4,4′-diaminodiphenyl ether were stirred in a dimethylacetamide solution at room temperature for 3 hours to give a solution of polyamide-acid having an inherent viscosity of 0.8. The obtained polyamide-acid was diluted to a 2% solution. A polyamide-acid orientation film having a film thickness of about 100 Å and an infrared dichroic ratio of 1.40 (wavelength 1500 cm$^{-1}$) was obtained in the same manner as described in Example 5. Then, the film was heated at 200° C. for 1 hour to give a polyimide film.

Then, a dichroic dye (LSB 235, a trade name, mfd. by Mitsubishi Chemical Industries Ltd.) in an amount of 3% was added to the ferroelectric liquid crystal composition used in Example 5. The liquid crystal display cell was obtained in the same manner as described in Example 5 and subjected to evaluation of orientation properties, memory properties and contrast ratio. As a result, no unevenness in orientation was admitted, uniform orientation properties were shown, the memory properties (M) were as good as M=1, and the contrast ratio was 12:1. Further, the liquid crystal display cell generated no static electricity, no short circuit between electrodes, and no breaking of electrodes.

EXAMPLE 7

0.1 Mole of pyromellitic dianhydride, 0.08 mole of silyl compound of 2,2-[4,4′-bis(p-aminophenoxy)-diphenyl]propane and 0.02 mole of sebasic acid dihydrazide were stirred in an N-methylpyrrolidone solution at room temperature for 5 hours to give a solution of polyamide acid-hydrazide acid having an inherent viscosity of 3.5. The obtained polyamide acid-hydrazide acid was diluted to a 6% solution with a solvent obtained by adding 30% of acetophenone to N-methylpyrrolidone. A polyamide acid-hydrazide acid orientation film having a film thickness of about 1000 Å was formed by the water surface spreading film-forming method in the same manner as described in Example 5. The orientation film wa laminated on an amorphous silicon semiconductor (picture element number 20 ×20) and heated at 180° C. for 2 hours. Into a formed space, the following nematic liquid crystal composition comprising:

(60 mole %)

(10 mole %)

(20 mole %)

(10 mole %)

was poured and the outer peripheral portion was sealed with an epoxy resin. Then, a pair of polarizing plates having the same polarizing axis direction as the film-forming direction of orientation film were adhered to the substrates to give an active matrix type liquid crystal display cell. The resulting liquid crystal display cell showed uniform orientation properties without unevenness in orientation. After conducting TFT operation, it was admitted that whole picture elements were lighted normally. The liquid crystal display cell generated no static electricity and no damage of TFT.

EXAMPLE 8

0.1 Mole of 3,3′,4,4′-biphenyltetracarboxylic dianhydride, 0.09 mole of 2,2-[4,4′-bis(p-aminophenoxy)-diphenyl]hexafluoropropane and 0.01 mole of diaminosiloxane were stirred in a dimethylacetamide solution at room temperature for 10 hours to give a solution of polyamide-acid siloxane having an inherent viscosity of 3.2. The obtained polyamide-acid siloxane solution was diluted to a 4% solution with dimethylacetamide/acetophenone so as to make the weight ratio of the solvents 1:1. A polyamide-acid siloxane orientation film having a film thickness of about 400 Å and an infrared dichroic ratio of 1.45 (wavelength 1500 cm$^{-1}$) was formed by the water surface spreading film-forming method in the same manner as described in Example 5. The orientation film was laminated on striped form transparent electrode substrates (electrode width 200 μm, space 50 μm), followed by heating at 250° C. for 1 hour to form polyimide siloxane by ring closure. The resulting substrates and absorption axis after polarization were adjusted so as to make the twisted angle of liquid crystal molecules 220°. Using a spacer of 6 μm thick, a space for filling a liquid crystal composition was formed in the same manner as described in Example 1. Then, the following nematic liquid crystal composition comprising:

was poured into the space and the outer peripheral portion was sealed with an epoxy resin. After producing an STN liquid crystal display cell in the same manner as described in Example 1, a scattering domain (a domain which scatters light) was examined. Generation of such a domain was not found and stable lighting in the whole picture element region was admitted. The STN liquid crystal display cell generated no static electricity, no short circuit between electrodes, and no breaking of electrodes. In addition, the electrodes were not visible by the naked eye.

COMPARATIVE EXAMPLE 1

0.1 Mole of pyromellitic dianhydride and 0.1 mole of 4,4'-diaminodiphenyl ether were stirred in a dimethylacetamide solution at room temperature for 5 hours to give a solution of p lyamide-acid. The resulting polyamide-acid solution was diluted to a 3% solution, which was spin coated on striped form transparent electrode substrates (electrode width 200 μm, space 50 μm) at 3000 rpm for 60 seconds to form an orientation film of about 500 Å thick. The film was heated at 250° C. for 1 hour for ring closure. Then rubbing treatment was carried out by revolving a rotor wound with AB Rayvel cloth (Type No. 40-7482 mfd. by Buehler Ltd.; revolution 600 rpm, notched amount 0.4 mm). The substrates and the absorption axis of the polarizing plates were adjusted so as to make the twisted angle of liquid crystal molecules 220°. The same nematic liquid crystal composition as used in Example 8 was sealed using an epoxy resin to form a liquid crystal display cell in the same manner as described in Example 8. The resulting liquid crystal display cell generated static electricity, short circuit between electrodes, and breaking of electrodes, resulting in producing badness in lighting. Further, changes and lowering of threshold value (Vth) properties were brought about in individual portions of the liquid crystal display cell and the stability of the whole cell was deteriorated.

COMPARATIVE EXAMPLE 2

0.1 Mole of 3,3',4,4'-benzophenonetetracarboxylic dianhydride and 0.1 mole of 2,2-[4,4'-bis(p-aminophenoxy)-diphenyl]propane were stirred in a N-methylpyrrolidone solution at room temperature for 8 hours to give a polyamide-acid solution. The resulting polyamide-acid solution was diluted to a 7% solution, which was coated on an amorphous silicon semiconductor substrate (picture element number 20 ×20) using a printer to form an orientation film of about 1000 Å. Then, the film was heated at 200° C. for 2 hours for ring closure and subjected to rubbing treatment using a revolving rotor wound with AB Rayvel cloth (revolution 600 rpm, notched amount 0.25 mm). The same nematic liquid crystal composition as used in Example 7 was sealed using an epoxy resin to form a liquid crystal display cell in the same manner as described in Example 7.

Electro-optical properties of the liquid crystal display cell were evaluated. When the TFT operation was conducted, static electricity was generated and lighting badness took place at several picture elements. Thus, stable display was impossible.

EXAMPLE 9

0.1 Mole of 3,3',4,4'-biphenyltetracarboxylic dianhydride and 0.1 mole of 2,2-[4,4'-bis(p-aminophenoxy)-diphenyl]hexafluoropropane were reacted in dimethylacetamide at room temperature for 4 hours to give a polyamide-acid solution. The polyamide-acid solution was diluted to a 5% solution with a mixed solvent of dimethylacetamide/acetophenone (1:1 weight ratio). A polyamide-acid orientation film was formed by the water surface spreading film-forming method at a film-forming speed of 12 m/min and laminated on striped form transparent electrode substrates, followed by heat treatment at 60° C. for 1 hour to give an orientation film of 300 Å thick with molecule orientation. The resulting orientation film was subjected to a rubbing treatment with rubbing strength of 0.2 mm, which strength was insufficient for giving orientation by a conventional rubbing treatment. A liquid crystal display cell was produced in the same manner as described in Example 1 using the same liquid crystal composition as used in Example 1.

The resulting liquid crystal display cell generated no static electricity, no short circuit between electrodes, and no breaking of electrodes. Further, since the pretilt directions was able to be arranged uniformly, no induced domain nor unevenness of display were generated.

EXAMPLE 10

A spreading solution was prepared by dissolving a thermotropic liquid crystal polyester obtained by copolymerizing 40 mole % of p-hydroxybenzoic acid with polyethylene terephthalate in a mixed solvent of phenol/tetrachloroethane (60/40 weight ratio) so as to make the polymer content 5%. The resulting solution was subjected to the water surface spreading film-forming at a film-forming speed of 5 m/min to give a polyester series liquid crystal polymer orientation film having a film thickness of 500 Å and an infrared dichroic ratio of 2.1 (wavelength 1160 cm$^{-1}$). The orientation film was laminated on striped form transparent electrode substrates (electrode width 200 μm, space 50 μm). A liquid crystal display cell was produced in the same manner as described in Example 1 using the same liquid crystal composition as used in Example 1. The resulting liquid crystal display cell showed uniform orientation properties without unevenness in orientation. The response speed was measured at frequency of 32 Hz and applied voltage of 5 V. As a result Tr was 6 msec. and Td was 25 msec. Further $\gamma = V_{90}/V_{10}$ was 1.55. Further, the liquid crystal display cell generated no static electricity, no short circuit between electrodes, and no breaking of electrodes. In addition, the electrodes were not visible by the naked eye.

EXAMPLE 11

A spreading solution was prepared by dissolving poly(p-phenyleneterephthalamide) in a mixed solvent of N-dimethylacetamide/acetophenone (70/30 weight ratio) so as to make the polymer content 4%. The resulting solution was subjected to the water surface spreading film-forming at a film-forming speed of 10 m/min to give a polyamide series liquid crystal polymer orientation film having a film thickness of 500 Å and an infrared dichroic ratio of 1.5 (wavelength 1640 cm$^{-1}$). Using the resulting liquid crystal polymer orientation film, a liquid crystal display cell was produced in the same manner a described in Example 1.

The resulting liquid crystal display cell was good in orientation properties. The response speed was measured at frequency of 32 Hz and applied voltage of 5 V. As a result, Tr was 8 msec., and Td was 25 msec. Further, $\gamma$ was 1.60. The liquid crystal display cell generated no static electricity, no short circuit between electrodes, and no breaking of electrodes. In addition, the electrodes were not visible by the naked eye.

EXAMPLE 12

A spreading solution was prepared by dissolving a copolymer of p-phenyleneterephthalamide and 3,8-phenanthridinoneterephthalamide (50/50 molar ratio) in a mixed solvent of N-methylpyrrolidone/N,N-dimethylacetamide/ acetophenone = 40/40/20 (weight ratio) so as to make the polymer content 5%. The resulting solution was subjected to the water surface spreading film-forming at a film-forming speed of 10 m/min to give a polyamide series liquid crystal polymer orientation film having a film thickness of 100 Å and an infrared dichroic ratio of 1.4 (wavelength 1640 cm$^{-1}$). The orientation film was laminated on striped form transparent electrode substrates (electrode width 200 μm, space 50 μm). A liquid crystal display cell was produced in the same manner as described in Example 5 using the same ferroelectric liquid crystal composition as used in Example 5. The resulting liquid crystal display cell showed uniform orientation properties without unevenness in orientation.

The memory properties evaluation was conducted and shown in FIG. 6. The memory properties (M) were 1 and the contrast ratio was as good as 10:1. The liquid crystal display cell generated no static electricity, no short circuit between electrodes and no breaking of electrodes.

EXAMPLE 13

A spreading solution was prepared by dissolving polyazophenol alkanoate having repeating units of

(n = preferably 10 to 50)

synthesized by interfacial polycondensation in a mixed solvent of p-chlorophenol/tetrachloroethane = 70/30 (weight ratio) so as to make the polymer content 5%. The resulting solution was subjected to the water surface spreading film-forming at a film-forming speed of 8 m/min to give a polyester series liquid crystal polymer orientation film having a film thickness of 1000 Å and an infrared dichroic ratio of 1.5 (wavelength 1500 cm$^{-1}$. The orientation film was laminated on amorphous silicon semiconductor substrates (picture element number 20 ×20). The resulting substrates were faced oppositedly via a spacer of 4 μm so as to make the orientation directions of the orientation films cross at a right angle. Into the resulting space, the same nematic liquid crystal composition as used in Example 7 was poured and outer peripheral portion was sealed with an epoxy resin. Then, a pair of polarizing plates having the same polarizing axis direction as the orientation direction of the orientation film was adhered to the substrates to give an active matrix liquid crystal display cell.

The resulting liquid crystal display device showed uniform orientation properties without unevenness in orientation. After conducting TFT operation, it was admitted that all the picture elements were normally lighted. The liquid crystal display cell generated no static electricity and no damage of TFT.

EXAMPLE 14

A spreading solution was prepared by dissolving a side chain type liquid crystal polysiloxane of the formula:

(n = preferably 10 to 100)

in a mixed solvent of toluene/methyl ethyl ketone = 80/20 (weight ratio) so as to make the polymer content 5%. The resulting solution was subjected to the water surface spreading film-forming at a film-forming speed of 10 m/min to give a polysiloxane series liquid crystal polymer orientation film having a film thickness of about 400 Å and an infrared dichroic ratio of 1.45 (wavelength 1160 cm$^{-1}$) on striped form transparent electrode substrates (electrode width 200 μm, space 50 μm). Then, the substrates and the absorption axis of polarizing plates were adjusted so as to make the twisted angle of liquid crystal molecules 220°. A space was formed using a spacer of 6 μm thick and filled with the same nematic liquid crystal composition as used in Example 8, followed by sealing with an epxoy resin. After producing an STN liquid crystal display cell in the same manner as described in Example 8, a scattering domain (a domain which scatters light) was examined. Generation of such a domain was not found and stable lighting in the whole picture element region was admitted. The STN liquid crystal display cell generated no static electricity, no short circuit between electrodes, and no breaking of electrodes. In addition, the electrodes were not visible by the naked eye.

COMPARATIVE EXAMPLE 3

Poly(p-phenyleneterephthalamide) was dissolved in N,N-dimethylacetamide so as to make the polymer content 3%. The resulting solution was spin coated on striped form transparent electrode substrates (electrode width 200 μm, space 50 μm) at 3000 rpm for 60 seconds to give an orientation film of about 500 Å thick. The orientation film was dried at 150° C. for 1 hour and subjected to a rubbing treatment with a revolving rotor wound with AB Rayvel cloth (revolution 600 rpm, notched amount 0.4 mm). The substrates and the absorption axis of polarizing plates were adjusted so as to make the twisted angle of liquid crystal molecules 220°. The same nematic liquid crystal composition as used in Example 8 was sealed using an epoxy resin to form a liquid crystal display cell in the same manner as described in Example 8. The resulting liquid crystal display cell generated static electricity, short circuit between electrodes, and breaking of electrodes, resulting in producing badness in lighting. Further, changes and lowering of threshold value (Vth) properties were brought about in individual portions of the liquid crystal display cell and the stability of the whole cell was deteriorated.

COMPARATIVE EXAMPLE 4

A thermotropic liquid crystal polyester obtained by copolymerizing polyethylene terephthalate with 40% by mole of p-hydroxybenzoic acid was dissolved in a mixed solvent of phenol/tetrachloroethane=60/40 so as to make the polymer content 2%. The resulting solution was coated on an amorphous silicon semiconductor substrate (picture element number 20 ×20) using a printer to form an orientation film of about 1000 Å. The film was heated at 150° C. for 1 hour for drying, followed by rubbing treatment using a revolving rotor wound with AB Rayvel cloth (revolution 600 rpm, notched amount 0.25 mm). The same nematic liquid crystal composition as used in Example 7 was sealed using an epoxy resin to form a liquid crystal display cell in the same manner as described in Example 7.

Electro-optical properties of the liquid crystal display cell were evaluated. When the TFT operation was conducted, static electricity was generated and lighting badness took place at several picture elements. Thus, stable display was impossible.

COMPARATIVE EXAMPLE 5

A side chain type liquid crystal polysiloxane of the formula:

(n = preferably 10 to 100)

was dissolved in tetrahydrofuran so as to make the polymer content 10%. The resulting solution was spin coated (2000 rpm, 30 sec.) on striped form transparent electrode substrates (electrode width 200 μm, space 50 μm) to form a film of about 500 Å Then, while heating the substrates at 120° C., a roller with a load of 1 kg from the perpendicular direction was moved at a speed of 1 cm/sec on upper surface of the coating so as to apply shear stress for providing oriented thin film substrate. The resulting substrates were faced oppositely via a spacer of 6 μm so as to make the shear stress of the substrates cross at a right angle. In the space thus formed, the same nematic liquid crystal composition as used in Example 1 wa filled and sealed with an epoxy resin. A pair of polarizing plates having the same polarizing axis direction as the shearing treatment direction were adhered to the substrates to give a liquid crystal display cell. The resulting liquid crystal display cell showed unevenness in orientation and was insufficient in uniformity.

What is claimed is:

1. A liquid crystal display cell comprising two spaced substrates having transparent electrodes arranged thereon in desired display patterns, a liquid crystal composition being sealed between the inner surfaces of said two substrates by a sealant, and two orientation films being arranged on individual transparent electrodes, at least one of said orientation films having an infrared dichroic ratio of 1.05 or more and a single layer film thickness of 0.003 μm or more and being obtained by spreading a solution of an organic polymer on a water surface and picking up a produced film.

2. A liquid crystal display cell according to claim 1, wherein the organic polymer is polyamide-acid or polyimide, or a copolymer thereof.

3. A liquid crystal display cell according to claim 1, wherein the organic polymer is a liquid crystal polymer having one or more mesogen groups in a main chain or a side chain.

4. A liquid crystal display cell according to claim 1, wherein the liquid crystal composition is a nematic liquid crystal composition.

5. A liquid crystal display cell according to claim 1, wherein the liquid crystal composition is a ferroelectric liquid crystal composition.

6. A liquid crystal display cell according to claim 1, wherein the liquid crystal composition is a nematic liquid crystal composition and takes a structure wherein a long axis direction of liquid crystal molecular is twisted 80° to 280° between the two electrode substrates under an electric field of zero.

7. A liquid crystal display cell according to claim 1, wherein the orientation film is formed on an insulating layer and/or a coupling agent layer, said insulating layer and coupling agent layer being formed under or above the electrodes.

8. A liquid crystal display cell according to claim 1, wherein the electrode is an active matrix electrode.

9. A liquid crystal display cell comprising two spaced substrates having transparent electrodes arranged thereon in desired display patterns, a liquid crystal composition being sealed between the inner surfaces of said two substrates by a sealant, and two orientation films being arranged on individual transparent electrodes, at least one of said orientation films having a single layer film thickness of 0.003 μm or more and being obtained by spreading a solution of an organic polymer on a water surface and taking up a produced film.

10. A process for producing a liquid crystal display cell, which comprises
supplying a solution of organic polymer on a water surface, drawing said solution in one direction to form a film having a single layer film thickness of 0.003 µm or more and an infrared dichroic ratio of 1.05 or more, adhering the resulting water surface spread film to a predetermined portion of electrodes arranged on a substrate, pouring a liquid crystal composition into a space formed by a pair of the thus produced electrode substrates having orientation films thereon and a spacer, and sealing the liquid crystal composition by a sealant.

11. A process according to claim 10, wherein the water surface spread film is taken up at a speed faster than a spontaneous spreading speed of the organic polymer solution on the water surface.

12. A process according to claim 10, wherein the water surface spread film is continuously adhered to a plurality of electrode substrates moving at the same speed as the taking-up speed of the water surface spreaded film.

13. A process according to claim 10, wherein the organic polymer is polyamide-acid or polyimide, or a copolymer thereof.

14. A process according to claim 10, wherein the organic polymer is a liquid crystal polymer having one or more mesogen groups in a main chain or a side chain.

* * * * *